I. SMITH.

Grate for Stoves.

No. 1,365. Reissued Dec. 16, 1862.

N. PETERS, Photo-Lithographer, Washington, D. C.

UNITED STATES PATENT OFFICE.

ISAAC SMITH, OF ALBANY, NEW YORK, ASSIGNOR TO S. H. RANSOM & CO., OF SAME PLACE.

IMPROVEMENT IN GRATES FOR STOVES.

Specification forming part of Letters Patent No. 30,769, dated November 27, 1860; Reissue No. 1,365, dated December 16, 1862.

*To all whom it may concern:*

Be it known that I, ISAAC SMITH, of Albany, county of Albany, and State of New York, have invented a new and Improved Grate for Burning Coal in Stoves; and I do hereby declare that the following is a full, clear, and exact description thereof, reference being had to the drawings, making part of this specification.

Figure 1:
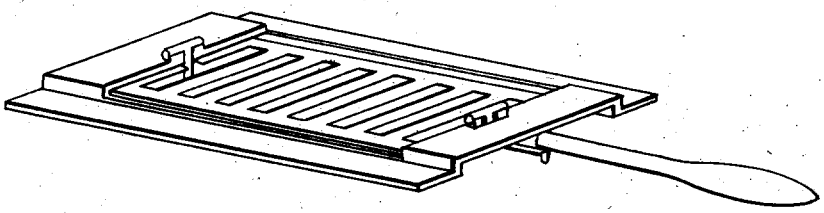
Figure 2:
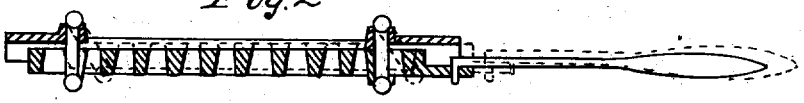
Figure 3:
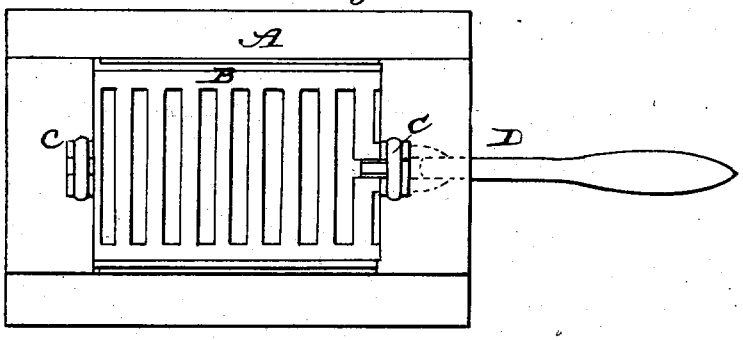
Figure 4:
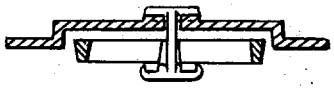

Figure 1 represents a perspective view of the grate and handle. Fig. 2 represents a central longitudinal section, also the lines of travel. Fig. 3 represents the plan. Fig. 4 represents a transverse section through one of the cranes or hinges.

The grate is made up of four pieces, besides the handle which works it.

A indicates the bed plate or frame; B, the fuel-grate; $C^2$ $C^2$, the cranes or hinges.

D indicates the handle by which the grate is moved upon the hinges.

The novelty and utility of my improvement consists in my original manner of moving the grate from end to end, so as to clear the coals from ashes in an easy, simple, and effectual manner.

There are several important advantages in this mode of constructing a grate. The bed-plate is inserted in a fire-chamber in the common way by laying it on the stops or supports. The grate is placed in its position under the bed-plate, and the cranes or hinges are hooked in without any trouble by pressing up the grate. The shaking hook or handle has a pivot or pin which fits a slot or hole in the grate, so that the grate may be worked with ease by a simple backward and forward movement of the handle.

Every part of my grate-fixtures can be molded and cast in the ordinary way, requiring no filing, fitting, or labor of mounting, except in cases where the carelessness of the molder has left some small fins to be smoothed off. The grate-fixtures do not exceed in weight those of ordinary grates of the same size and strength. The cost of construction is no more than that of ordinary grates.

If for any purpose it is desirable, the grate may be poked or raked like any common grate without being shaken. The bed-plate and hinges are protected from the action of fire by brick or soapstone, and the bottom grate alone is exposed to the fire, and may be made as heavy and durable as any.

The principal benefit attained by my invention is the ease and facility with which the cleaning of the fire is accomplished. I secure this result by the peculiar method of swinging the grate on its hinges by the slightest possible effort or touch, also by obviating the objection common to all grates of catching and holding pieces of coal between the openings made by rocking the grate to and fro. In moving my improved grate no opening is made when working that does not exist when still; neither is there any increase of any opening, and the grate working below, and being fully covered by the bed-plate, allows no coal to stop the motion while being worked. The cranes or hinges represented by the drawings of this specification are shaped much like the letter, H the vertical parts of that letter being used horizontally in the cranes or hinges I, but, as is evident, other forms of cranes or hinges may be used.

What I claim as my invention, and desire to secure by Letters Patent, is—

Suspending the grate by cranes or hinges, substantially as set forth.

This specification signed this 31st day of October, 1862.

ISAAC SMITH.

Witnesses:

JOHN J. CLARK,

GEORGE L. STEADMAN.